Patented Oct. 22, 1940

2,218,592

UNITED STATES PATENT OFFICE 2,218,592

VITAMIN PREPARATION AND METHOD OF MAKING SAME

Harden F. Taylor, New York, N. Y., assignor to The Atlantic Coast Fisheries Company, New York, N. Y., a corporation of Maine No Drawing. Application June 17, 1939, Serial No. 279,660

28 Claims. (Cl. 99—11)

This invention relates to vitamin preparations and the method of making the same. More particularly, this invention relates to substantially dry vitamin preparations, such as beadlets or molded products, containing a plasticizer which, in addition to maintaining the accessibility of the vitamins of the matrix of the preparation to the digestive tract, also protects the vitamins from adverse effects upon exposure to air for appreciable periods of time.

In my copending applications Serial No. 105,086 and Serial No. 113,988, now Patent No. 2,183,053 there are disclosed vitamin preparations in the form of beadlets or molded products and containing discrete or minute particles of vitamin-bearing liquids dispersed and completely imprisoned in a matrix consisting of a digestible colloidal substance, such as gelatin, with or without a plasticizer, and the method of making the same. Though the just-mentioned products and methods constitute a marked improvement in the preservation of labile vitamins, further research has shown that the products undergo adverse changes upon exposure to the air. For example, it has been found that if vitamin-bearing oil, such as halibut liver oil, is dispersed in pure gelatin, without plasticizer, and the gelatin then formed into beadlets, as described in my previously-mentioned copending applications, and the beadlets are exposed to air, the gelatin interfaces in contact with the surface of the minute oil droplets appear to be attacked by or to react with the oil and to become less soluble, and even insoluble, in the course of time. This insolubilization of the gelatin matrix is, of course, undesirable in that it may render the contained oil less accessible to the digestive process in the alimentary system.

I have further observed that, when pure gelatin, without plasticizer, is used as the matrix for the vitamin oils in the beadlets, some of the oil seems to find its way through the surrounding gelatin to the external surfaces and, of course, insofar as this occurs, the oil which reaches the surface is then exposed and subject to deterioration. The explanation of this phenomenon must remain in the realm of theory until more is known of the ultimate structure of the gels, but it may be assumed from the theoretical standpoint that the dry gelatin is some kind of web three-dimensional lacework of molecules or perhaps a cellular structure through which the molecules of oil find their way. Contrariwise, through such microfine structures, the molecules of oxygen may find their way into the oil imprisoned in the gelatin, but these matters, as above explained, must remain hypothetical explanations so long as the structures of the gels are inaccessible to observation. From the practical point of view, I find that the vitamin oil does, under some conditions, find its way to the surface of the beadlets and it does, albeit very slowly, diminish in potency and the beadlets do slowly become less soluble than when they were first made.

In earlier experiments I attempted to overcome the aforementioned disadvantages by the addition of plasticizers, such as glycerin, sorbitol, ethylene glycol, glucose, and the like, the governing idea being that if the lacework or cellular structure of the gelatin could be filled in with molecules of different sizes and shapes, such as those of the plasticizers, the web or cellular structure of the gel would be less permeable to oil outwardly to the surface or to oxygen inwardly from the exterior.

Though the use of the foregoing plasticizers was an advance in the art, I have now found that by the use of certain substances as plasticizers the gelatin containing the discrete particles of oil will be rendered less permeable to oil or oxygen and the accessibility of the oil to the digestive tract will be maintained, whereby the defects of the prior art overcome in a most effective manner.

An object of this invention is to overcome the above-mentioned disadvantages and to provide a substantially dry, edible vitamin preparation in which the vitamins are protected from the adverse effects of exposure to air for long periods of time while the accessibility of the vitamins in the matrix of the preparation is maintained when taken into the digestive tract.

Another object of this invention is to prepare a dry vitamin preparation, in the form of beadlets or molded products, containing discrete particles of a vitamin-bearing liquid or oil dispersed in and completely surrounded by a colloidal matrix having incorporated therein a plasticizer which renders the walls of the matrix less permeable to the oil or to oxygen and maintains the accessibility of the vitamin-bearing liquid or oil to the digestive tract.

Other objects will appear from the following description and appended claims.

After considerable research and experimental work, I have found that, when gelatin is plasticized with substantial amounts of honey, and vitamin-bearing liquids or oils are dispersed and imprisoned therein, the resultant product may be subjected to severe exposure to air under the influence of both heat and light without destroying the accessibility of the vitamin-bearing liquid to the digestive tract and with no loss or a much diminished loss of vitamin potency. I also have found that molasses and other substances containing invert sugar have similar properties to honey and, therefore, the invention in its broad phase contemplates the use of invert sugars for the purposes herein set forth.

I am unable to say, except by surmise or hypothesis, why the plasticizers (invert sugars) herein disclosed function in the manner in which they do. Be it as it may, quantitative experiments have shown most decidedly that honey, molasses and other substances whose main ingredients are invert sugars accomplish the objects of this invention, i. e., to maintain for long periods of time the accessibility of the vitamin-bearing liquids to the digestive tract with no loss or a much diminished loss of vitamin potency in a most effective manner. Honey, of course, has been known from ancient times to possess certain preservative properties and I do not claim to have discovered this fact. Honey does not readily mold or ferment and it has served as a preservative for perishable specimens, such as flowers, small animals and insects. Whether the preservative effect of honey is due to its high concentration of sugar and low moisture content or whether, in addition to these, it contains definite chemical substances having preservative powers I do not know.

That honey and molasses and similar substances whose main ingredients are the invert sugars produce most remarkable and unexpected results is shown by comparison with vitamin preparations made prior to this invention. These remarkable results are clearly shown by the results set forth in the following table:

*Comparative effects of plasticizers and other substances in stabilizing vitamin A, as shown by the E values of 1%/1 cm. at 3280A*

| Days stored | Composition of matrix | | | | |
|---|---|---|---|---|---|
| | 100% gelatin | 99.5% gelatin, 0.5% thiourea | 76.5% gelatin, 23.5% sorbitol | 40.0% gelatin, 60.0% honey | 40.0% gelatin, 60.0% molasses |
| 5 | | | 19.6 | | |
| 6 | 35.7 | | 17.2 | 35.6 | 31.9 |
| 7 | | | | 13.1 | |
| 10 | | | 13.6 | | |
| 13 | 10.0 | | | 31.3 | 31.3 |
| 14 | | | No oil recovered (insoluble). | | |
| 20 | 11.8 | | | 30.6 | 29.7 |
| 21 | | | 13.6 | | |
| 22 | | | 13.3 | | |
| 27 | 8.9 | | | 30.3 | |
| 31 | | | | | 24.8 |
| 35 | | | 8.9 | | |
| 48 | | | | | 22.3 |
| 51 | | | | 27.4 | |
| 69 | | | | | 25.9 |

The expression "E value of 1%/1 cm. at 3280A" defines the extinction coefficient (E) at the line 3280A of a cell 1 cm. in thickness of a 1% solution of the composition in isopropyl alcohol determined by means of the quartz spectrometer (the standard and highly accurate method of determining vitamin A content of materials). For conversion into U. S. P. units of vitamin A, the E values are multiplied by the factor 2,000.

Each of the compositions referred to in the table was made to contain the same quantity of vitamin-bearing liquid or oil. It is to be noted that the table merely sets forth the composition of the matrix and it is to be further noted that the matrices consist of 100% gelatin; gelatin plus an antioxidant, such as, for example, thiourea; and gelatin containing a plasticizer, such as, for example, sorbitol. It is to be understood that other plasticizers similar to sorbitol will function in a manner comparable to sorbitol. It is further to be noted that the results obtained from the composition containing the antioxidant thiourea show no noticeable improvement over compositions which consisted of gelatin without any antioxidant. Similar results were obtained with other antioxidants when used in this combination.

There is evidence in the above tabulated results, and in other experimental results not shown here, that gelatin may not be merely a passive matrix, but chemically active in some way in promoting the destruction of vitamin A. Supporting this view is the fact that the higher the content of honey and molasses, and by corollary, the lower the percentage of gelatin, the more stable the vitamin appears to be. From this point of view, it must be inferred that the main purpose served by the gelatin in any event is the practical one of producing beadlets or molded products. At the present time it would be exceedingly difficult to make solid free-flowing beadlets or molded products of pure honey or molasses, since they must be converted while in a sticky or semi-liquid consistency to manageable shapes having the properties of solids. This, however, can be achieved by converting a liquid after it has been brought to the desired shape at warm temperature to a gel state at a lower temperature, and gelatin is one of the substances for this purpose. Other substances, such as, for example, pectin, may be used in place of gelatin.

The expression "gelable" is used in this specification and claims to cover a substance which can be converted from a liquid to the gel state.

From the foregoing it will be seen that honey is peculiarly adapted for the purposes herein described and has not heretofore been used for such purposes. The use of honey, as herein described, is manifestly a decided improvement and advance in the art of preparing vitamins in a dry vehicle and protecting said vitamins from the adverse effects of exposure of the product to air while maintaining the accessibility of the vitamins to the digestive tract when introduced therein.

In the production of dry vitamin preparations, such as gelatin beadlets or molded forms, the quantity of invert sugar which is preferably used is such as will not produce any tackiness or greasiness in the final product, if the final product is not coated. Of course, if the final product is to be coated, then a greater quantity of invert sugar may be used. Satisfactory results are secured when the dry vitamin preparations, such as gelatin beadlets or (non-coated) molded products, contain not more than 3 parts of invert sugar to 1 part of gelatin, the proportions being by weight.

To produce the composition which is to be formed into beadlets or other molded forms, a selected quantity of pure gelatin is first swollen in an appropriate quantity of water and thereafter dissolved therein while the temperature is brought to approximately 50° C. to 65° C. An appropriate quantity of honey is added with stirring and the mixture stirred until it is a homogeneuous solution. To the resulting homogeneous water-gelatin-honey mixture, and while at the elevated temperature, the desired quantity of fish liver oil containing the vitamin or vitamin concentrate, etc. is added and emulsified therein whereby the fish liver oil or vitamin concentrates are broken up into fine droplets or discrete particles and dispersed therein, forming an emulsion wherein the gelatin-honey-water solution constitutes the continuous phase and the vitamin-bearing liquids constitute the dispersed phase. The dispersion of the fish liver oil containing the vitamin A, or the vitamins A and D, may be effected simultaneously with the introduction thereof into the gelatin-honey-water solution, as by stirring the mass during the addition of the fish lever oil or vitamins. Alternatively, the fish liver oil or vitamins may be added and the resultant mixture vigorously agitated until the desired degree of dispersion is obtained.

The water in which the gelatin is dissolved is preferably treated to remove any oxidizing agents, such as by boiling, to expel any oxygen therein. The gelatin is also freed of any oxidizing substances, if it contains the same.

The emulsion is characterized by a relatively high concentration of gelatin. As a consequence, it is a viscous liquid at an elevated temperature and upon cooling sets to form a firm gel or jelly.

The amount or potency of the fish liver containing the vitamin A or the vitamin concentrate containing vitamins A and D emulsified in the gelatin solution is based on the vitamin potency desired in the finished product. It is to be understood, of course, that the quantity of fish liver oil must be low enough to be fully dispersed in the water-gelatin-honey solution without becoming a continuous phase and without exuding liquid oil in the final product.

When a transparent product is desired, this can be secured by adjusting the refractive index of the two phases to substantially identical values. For example, a suitable and appropriate amount of a substance having a high index of refraction may be dissolved in the vitamin-bearing liquid to bring its refractive index to substantially the same value as that of the gelatin solution.

If desired, coloring agents may be incorporated into the dispersion so as to produce colored products and/or to include wave lengths other than that excluded by the gelatin which will constitute the matrix in the final product.

If desired, other vitamins may be incorporated at any stage in the preparation of the solution from which the product is made. For example, vitamin E may be incorporated in the composition by adding wheat germ oil or its equivalent to the fish liver oil or vitamins A and D prior to the dispersion into the honey-gelatin solution. Alternatively, the vitamin-bearing E oils may be separately dispersed in the honey-gelatin solution and the resultant mass homogenized in the honey vitamin A composition. The vitamins of the entire B complex may also be added, if desired, as by the addition of either the pure crystalline vitamin or substances, such as yeast, yeast concentrates, liver or liver concentrates, or rice polishing concentrates, in any of the manners previously described. Since honey is naturally of an acid reaction, vitamins C, B₁ and G may be used therewith, and especially in admixture with vitamin A or D, or both.

The gelatin-honey-vitamin-containing emulsion can be formed into various dry vitamin preparations of divers shapes and forms according to the nature and use of the preparation. It may be formed into beadlets or molded forms of any shape or form, such as pellets, tablets, etc. In order to produce the dry vitamin preparation, constituting one phase of this invention, the emulsion is subdivided or formed into the desired shape or form while the emulsion is in liquid state and at an elevated temperature, and thereafter caused to set, by cooling, to form a firm gel or jelly.

In the preferred embodiment of the invention relating to the production of beadlets, the gelatin-honey-vitamin-containing dispersion is introduced into an excess of oil, such as vegetable oil, for example, soya bean oil, maintained at a temperature insufficient to gel the dispersion, such as from 55° C. to 60° C., with the whole being continuously stirred or agitated by means of a high speed mixer until the gelatin-honey-vitamin-containing emulsion has been subdivided to produce the desired size of beadlet. The size of the final beadlets is determined by the amount of agitation. After the desired size of beadlets has been secured, the oil, and hence the mass, is chilled and the gelatin-honey-vitamin-containing beadlets set to form a firm gel or jelly.

The excess soya bean oil is removed by decantation or filtration and thereafter the beadlets are treated with a liquid which removes any oil adhering to the beadlets and dehydrates the gelatin beadlets. In the preferred form of this phase of the process, the beadlets are washed with isopropyl alcohol which removes the oil adhering thereto and simultaneously dehydrates and hardens the beadlets. The thus-treated beadlets are then spread on a suitable medium, such as paper, and exposed to the atmosphere until they come to equilibrium with the atmosphere.

The beadlets resulting from the hereinbefore described process are free flowing, dry, finely divided, substantially spherical particles which may be sifted into the desired sizes and may be used as more fully described in my application Serial No. 105,086, of which this application is a continuation-in-part.

In the production of molded products, such as tablets, etc., the gelatin-honey-vitamin-bearing oil dispersion is introduced into molds of appropriate size and permitted to solidify therein. The molds are preferably lubricated, such as, for example, with castor oil, and, after solidification, the molded products are removed from the molds and are treated to remove the castor oil adhering to the molded product, and thereafter dried to equilibrium with the atmosphere. The castor oil may be removed by the treatments above set forth in connection with the production of beadlets. In the preferred form of this phase of the invention the castor oil is removed from the molded product by washing with petroleum ether. The thus-treated products may be exposed for drying in a manner similar to that employed in connection with the production of beadlets.

The molded products produced by the method hereinbefore described may be globular, oval, elongated, etc.

The beadlets or other molded products produced in accordance with this invention comprise a carrier or matrix comprising a mixture of gelatin and an invert sugar, and having discrete particles of a vitamin-bearing liquid dispersed in and completely imprisoned by said matrix, whereby no free oil is present on the exterior surfaces of the product. By virtue of the preservative properties of the invert sugar, the vitamins are protected against deterioration upon exposure of the preparations to air. Also, the invert sugar maintains the accessibility of the vitamin-bearing liquid or oil to the digestive tract, whereby the vitamin-bearing liquid or oil is easily assimilated.

Still further, the well-known pleasant flavor of the invert sugar is imparted to the product.

As a consequence of the foregoing properties, the beadlets or molded products are permanently plastic, pleasing to the taste, easily chewable and the vitamins easily accessible to the digestive tract.

Hereinafter are set forth several illustrative examples of compositions produced in accordance with this invention and which have resulted in satisfactory vitamin preparations in the dry form, i. e., beadlets, tablets, etc.

|  | Parts by weight |
|---|---|
| Gelatin | 80 |
| Water | 120 |
| Honey | 32 |
| Fish liver oil | 33.6 |
| Gelatin | 80 |
| Water | 120 |
| Honey | 48 |
| Fish liver oil | 38.4 |
| Gelatin | 80 |
| Water | 120 |
| Honey | 64 |
| Fish liver oil | 43.2 |
| Gelatin | 80 |
| Water | 180 |
| Honey | 120 |
| Fish liver oil | 60 |
| Gelatin | 100 |
| Water | 220 |
| Molasses | 200 |
| Fish liver oil | 90 |
| Gelatin | 100 |
| Water | 200 |
| Molasses | 150 |
| Fish liver oil | 75 |
| Gelatin | 100 |
| Water | 230 |
| Molasses | 300 |
| Fish liver oil | 120 |

Since it is obvious that various changes and modifications may be made in the above description without departing from the nature or spirit thereof, this invention is not restricted thereto except as set forth in the appended claims.

I claim:

1. A substantially dry vitamin preparation containing discrete particles of vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the preparation to air.

2. A substantially dry vitamin preparation containing discrete particles of a vitamin-bearing liquid dispersed in and completely imprisoned in a matrix comprising gelatin and an invert sugar whereby no free vitamin-bearing liquid is present on the exterior surfaces of the product, said vitamin-bearing liquid containing at least vitamin A, said invert sugar plasticizing said gelatin and inhibiting the deterioration of the vitamin upon exposure of the preparation to air.

3. A substantially dry vitamin preparation containing discrete particles of a vitamin-bearing liquid dispersed in and completely imprisoned in a matrix comprising gelatin and honey whereby no free vitamin-bearing liquid is present on the exterior surfaces of the product, said vitamin-bearing liquid containing at least vitamin A, said honey plasticizing said gelatin and inhibiting the deterioration of the vitamin upon exposure of the preparation to air.

4. A substantially dry vitamin preparation containing discrete particles of a vitamin-bearing liquid dispersed in and completely imprisoned in a matrix comprising gelatin and molasses whereby no free vitamin-bearing liquid is present on the exterior surfaces of the product, said vitamin-bearing liquid containing at least vitamin A, said molasses plasticizing said gelatin and inhibiting the deterioration of the vitamin upon exposure of the preparation to air.

5. A substantially dry vitamin preparation containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the preparation to air, said invert sugar being present in an amount insufficient to render the product tacky.

6. A substantially dry vitamin preparation containing discrete particles of a vitamin-bearing liquid dispersed in and completely imprisoned in a matrix comprising gelatin and an invert sugar whereby no free vitamin-bearing liquid is present on the exterior surfaces of the product, said vitamin-bearing liquid containing at least vitamin A, said invert sugar plasticizing said gelatin and inhibiting the deterioration of the vitamin upon exposure of the preparation to air, said invert sugar being present in an amount insufficient to render the product tacky.

7. A substantially dry vitamin preparation containing discrete particles of a vitamin-bearing liquid dispersed in and completely imprisoned in a matrix comprising gelatin and honey whereby no free vitamin-bearing liquid is present on the exterior surfaces of the product, said vitamin-bearing liquid containing at least vitamin A, said honey plasticizing said gelatin and inhibiting the deterioration of the vitamin upon exposure of the preparation to air, said honey being present in an amount insufficient to render the product tacky.

8. A substantially dry vitamin preparation containing discrete particles of a vitamin-bearing liquid dispersed in and completely imprisoned in a matrix comprising gelatin and molasses whereby no free vitamin-bearing liquid is present on the exterior surfaces of the product, said vitamin-bearing liquid containing at least vitamin A, said molasses plasticizing said gelatin and inhibiting the deterioration of the vitamin upon exposure of the preparation to air, said molasses being present in an amount insufficient to render the product tacky.

9. A substantially dry vitamin preparation containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the preparation to air, the ratio of the quantity of invert sugar to the colloid being not greater than 3:1 by weight.

10. A substantially dry vitamin preparation containing discrete particles of a vitamin-bearing liquid dispersed in and completely imprisoned in a matrix comprising gelatin and an invert sugar whereby no free vitamin-bearing liquid is present on the exterior surfaces of the product, said vitamin-bearing liquid containing at least vitamin A, said invert sugar plasticizing said gelatin and inhibiting the deterioration of the vitamin upon exposure of the preparation to air, the ratio of the quantity of invert sugar to gelatin being not greater than 3:1 by weight.

11. A substantially dry vitamin preparation containing discrete particles of a vitamin-bearing liquid dispersed in and completely imprisoned in a matrix comprising gelatin and honey whereby no free vitamin-bearing liquid is present on the exterior surfaces of the product, said vitamin-bearing liquid containing at least vitamin A, said honey plasticizing said gelatin and inhibiting the deterioration of the vitamin upon exposure of the preparation to air, the ratio of the quantity of honey to gelatin being not greater than 3:1 by weight.

12. A substantially dry vitamin preparation containing discrete particles of a vitamin-bearing liquid dispersed in and completely imprisoned in a matrix comprising gelatin and molasses whereby no free vitamin-bearing liquid is present on the exterior surfaces of the product, said vitamin-bearing liquid containing at least vitamin A, said molasses plasticizing said gelatin and inhibiting the deterioration of the vitamin upon exposure of the preparation to air, the ratio of the quantity of molasses to gelatin being not greater than 3:1 by weight.

13. A dry vitamin preparation consisting essentially of free-flowing beadlets, said beadlets containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the beadlet to air, the quantity of said invert sugar being insufficient to render the product tacky.

14. A dry vitamin preparation consisting essentially of molded products containing discrete particles of a vitamin-bearing liquid dispersed in and completely imprisoned in a matrixe comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the molded product to air, the quantity of said invert sugar being insufficient to render the product tacky.

15. A substantially dry vitamin preparation containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the preparation to air, and said invert sugar maintaining the accessibility of the vitamin-bearing liquid to the digestive tract.

16. A substantially dry vitamin preparation containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the preparation to air, said invert sugar being present in an amount insufficient to render the product tacky, and said invert sugar maintaining the accessibility of the vitamin-bearing liquid to the digestive tract.

17. A dry vitamin preparation consisting essentially of free-flowing beadlets, said beadlets containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the beadlet to air, the quantity of said invert sugar being insufficient to render the product tacky, and said invert sugar maintaining the accessibility of the vitamin-bearing liquid to the digestive tract.

18. A dry vitamin preparation consisting essentially of molded products containing discrete particles of a vitamin-bearing liquid dispersed in and completely imprisoned in a matrix comprising a gelable colloid and an invert sugar whereby no free vitamin-bearing liquid is present on the exterior surfaces of the product, said vitamin-bearing liquid containing at least vitamin A, said invert sugar plasticizing said colloid and inhibiting the deterioration of the vitamin upon exposure of the molded product to air, the quantity of said invert sugar being insufficient to render the product tacky, and said invert sugar maintaining the accessibility of the vitamin-bearing liquid to the digestive tract.

19. A dry vitamin preparation consisting essentially of free-flowing beadlets, said beadlets containing discrete particles of a vitamin-bearing liquid dispersed in and completely imprisoned in a matrix comprising a gelable colloid and honey whereby no free vitamin-bearing liquid is present on the exterior surfaces of the product, said vitamin-bearing liquid containing at least vitamin A, said honey plasticizing said colloid and inhibiting the deterioration of the vitamin upon exposure of the beadlets to air, the quantity of said honey being insufficient to render the product tacky.

20. A dry vitamin preparation consisting essentially of free-flowing beadlets, said beadlets containing discrete particles of a vitamin-bearing liquid dispersed in and completely imprisoned in a matrix comprising a gelable colloid and molasses whereby no free vitamin-bearing liquid is present on the exterior surfaces of the product, said vitamin-bearing liquid containing at least vitamin A, said molasses plasticizing said colloid and inhibiting the deterioration of the vitamin upon exposure of the beadlets to air, the quantity of said molasses being insufficient to render the product tacky.

21. A dry vitamin preparation consisting essentially of free-flowing beadlets, said beadlets containing discrete particles of a vitamin-bearing liquid dispersed in and completely imprisoned in a matrix comprising gelatin and an invert sugar whereby no free vitamin-bearing liquid is present on the exterior surfaces of the product, said vitamin-bearing liquid containing at least vitamin A, said invert sugar plasticizing said gelatin and inhibiting the deterioration of the vitamin upon exposure of the beadlet to air, the quantity of said invert sugar being insufficient to render the product tacky.

22. A dry vitamin preparation consisting essentially of free-flowing beadlets, said beadlets containing discrete particles of a vitamin-bearing liquid dispersed in and completely imprisoned in a matrix comprising gelatin and honey whereby no free vitamin-bearing liquid is present on the exterior surfaces of the product, said vitamin-bearing liquid containing at least vitamin A, said honey plasticizing said gelatin and inhibiting the deterioration of the vitamin upon exposure of the beadlets to air, the quantity of said honey being insufficient to render the product tacky.

23. A dry vitamin preparation consisting essentially of free-flowing beadlets, said beadlets containing discrete particles of a vitamin-bearing liquid dispersed in and completely imprisoned in a matrix comprising gelatin and molasses whereby no free vitamin-bearing liquid is present on the exterior surfaces of the product, said vitamin-bearing liquid containing at least vitamin A, said molasses plasticizing said gelatin and inhibiting the deterioration of the vitamin upon exposure of the beadlets to air, the quantity of said molasses being insufficient to render the product tacky.

24. A dry vitamin preparation consisting essentially of molded products containing discrete particles of a vitamin-bearing liquid dispersed in and completely imprisoned in a matrix comprising a gelable colloid and honey whereby no free vitamin-bearing liquid is present on the exterior surfaces of the product, said vitamin-bearing liquid containing at least vitamin A, said honey plasticizing said colloid and inhibiting the deterioration of the vitamin upon exposure of the molded product to air, the quantity of said honey being insufficient to render the product tacky.

25. A dry vitamin preparation consisting essentially of molded products containing discrete particles of a vitamin-bearing liquid dispersed in and completely imprisoned in a matrix comprising a gelable colloid and molasses whereby no free vitamin-bearing liquid is present on the exterior surfaces of the product, said vitamin-bearing liquid containing at least vitamin A, said molasses plasticizing said colloid and inhibiting the deterioration of the vitamin upon exposure of the molded product to air, the quantity of said molasses being insufficient to render the product tacky.

26. A dry vitamin preparation consisting essentially of molded products containing discrete particles of a vitamin-bearing liquid dispersed in and completely imprisoned in a matrix comprising gelatin and an invert sugar whereby no free vitamin-bearing liquid is present on the exterior surfaces of the product, said vitamin-bearing liquid containing at least vitamin A, said invert sugar plasticizing said gelatin and inhibiting the deterioration of the vitamin upon exposure of the molded product to air, the quantity of said invert sugar being insufficient to render the product tacky.

27. A dry vitamin preparation consisting essentially of molded products containing discrete particles of a vitamin-bearing liquid dispersed in and completely imprisoned in a matrix comprising gelatin and honey whereby no free vitamin-bearing liquid is present on the exterior surfaces of the product, said vitamin-bearing liquid containing at least vitamin A, said honey plasticizing said gelatin and inhibiting the deterioration of the vitamin upon exposure of the molded product to air, the quantity of said honey being insufficient to render the product tacky.

28. A dry vitamin preparation consisting essentially of molded products containing discrete particles of a vitamin-bearing liquid dispersed in and completely imprisoned in a matrix comprising gelatin and molasses whereby no free vitamin-bearing liquid is present on the exterior surfaces of the product, said vitamin-bearing liquid containing at least vitamin A, said molasses plasticizing said gelatin and inhibiting the deterioration of the vitamin upon exposure of the molded product to air, the quantity of said molasses being insufficient to render the product tacky

HARDEN F. TAYLOR.